United States Patent [19]

Linhardt et al.

[11] 4,292,050
[45] Sep. 29, 1981

[54] CURVED DUCT SEPARATOR FOR REMOVING PARTICULATE MATTER FROM A CARRIER GAS

[75] Inventors: Hans D. Linhardt, Newport Beach; John H. Beveridge, San Clemente, both of Calif.

[73] Assignee: Linhardt & Associates, Inc., Newport Beach, Calif.

[21] Appl. No.: 94,510

[22] Filed: Nov. 15, 1979

[51] Int. Cl.³ .............................................. B01D 45/12
[52] U.S. Cl. ............................................ 55/1; 55/73; 55/90; 55/440; 55/461; 55/269
[58] Field of Search ............... 55/392, 440, 397, 461, 55/73, 90, 269; 209/143, 146, 147

[56] References Cited

U.S. PATENT DOCUMENTS

| 2,468,607 | 4/1949 | Schneikle | 55/398 |
| 2,696,911 | 12/1954 | Umney | 55/461 |
| 3,509,932 | 5/1970 | Chambers | 55/461 |
| 3,710,561 | 1/1973 | Garrone | 55/461 |
| 3,755,990 | 9/1973 | Hardison | 55/93 |
| 3,972,696 | 8/1976 | Angelillo | 110/119 |
| 4,147,534 | 4/1979 | Hori | 55/17 |

FOREIGN PATENT DOCUMENTS

| 352654 | 5/1922 | Fed. Rep. of Germany | 55/397 |
| 543466 | 2/1932 | Fed. Rep. of Germany | 55/397 |
| 570578 | 7/1945 | United Kingdom | 55/394 |
| 2002568 | 2/1979 | United Kingdom | 55/267 |

OTHER PUBLICATIONS

Linhardt-Investigation of High Velocity Wedge Separator for Particle Removal, Airco Cryogenics Irvine, Calif., D.O.E. Contract EF-77-C-01-2709.

Primary Examiner—Bernard Nozick
Attorney, Agent, or Firm—Jackson, Jones & Price

[57] ABSTRACT

A separator for separating micron and submicron sized particles from a carrying gas, is disclosed. A carrier gas contains a component which is capable of condensation in the separator. The carrier gas is accelerated and flows at high velocity in a duct. The lower limit of the high velocity is approximately Mach 1.0. Due to the acceleration to the high velocity the static temperature of the carrying gas decreases. As a result, the condensable component condenses on micron and mainly on submicron sizes particles which act as nucleation sites. Liquid droplets formed during the condensation are in the micron size range. The paths of the high velocity flow of the carrier gas and of the solid and liquid particles carried therein is influenced by a combination of a centrifugal force and an oblique shock zone which is created within the high velocity flow. As a result, the particles travel a different path than the carrying gas and are effectively captured and disposed by an appropriately positioned receiving member.

8 Claims, 9 Drawing Figures

CURVED DUCT SEPARATOR FOR REMOVING PARTICULATE MATTER FROM A CARRIER GAS

BACKGROUND OF THE INVENTION

1. Field of the Invention

The present invention relates to a system for separating particulate matter carried in a gas composition, and more particularly to a system for cleaning up gasses emitted by a fuel burning unit prior to releasing said gases into the environment.

2. Description of the Prior Art

The problems associated with removing particulate matter from gas compositions, and particularly the problems associated with removing particulate matter from the stack gases of a coal burning furnace are well known to those skilled in the art. In addition to emitting particulate matter, coal burning furnaces emit a significant amount of sulphur dioxide and alkali metal compounds, the removal of which presents a problem of a different dimension than the removal of particulate matter.

In the past, filters and cyclone separators of various designs have been used for the removal of solid particles from carrier gas compositions such as stack gases, and gaseous products of coal gasification plants. Because filters and cyclone separators in high temperature applications are incapable of removing particles of less than 10 micron in size, electrostatic precipitators have usually been employed for the removal of such smaller particles from the stack gases and the like.

Electrostatic precipitators, however, suffer from the disadvantages of high costs of initial construction and of relatively high energy input requirements. However neither filters, cyclone separators, nor electrostatic precipitators remove sulphur dioxide gas from stack gases. Consequently absorption towers and like systems have been resorted to in the past to reduce the sulphur dioxide content of stack gases through absorption in water to a more or less acceptable level. Overall, the inability of the prior art to provide for effective clean-up of stack gases at an acceptable cost has been a major factor in preventing large scale utilization of coal as a major source of electric power in the United States.

In a report submitted to the United States Department of Energy, Division of Coal Conversion and Utilization, under contract EF-77-C-01,2709, written by Hans D. Lindhardt, titled "Investigation of High Velocity Wedge Separator for Particle Removal in Coal Gasification Plants" an experimental system was described for the removal of particulate matter from a carrier gas composition produced in a coal gasification plant.

The system described in the above referenced report utilizes a wedge or a substantially wedge like obstruction positioned in a supersonic flow of the carrier gas to alter the flow path of the carrier gas while leaving the flow path of the particulate matter unaffected. A receiving member defining an appropriately positioned slot is then placed into the flow path of the particulate matter to capture the same. The report suggests that an array of separator elements or units, each unit including a nozzle wherein the carrier gas is accelerated to a supersonic speed, a substantially wedge shaped obstruction and a receiving member could be used in a system scaled for industrial use.

The above referenced report contains an extensive mathematical treatment of the relationship of the several physical parameters which must be considered in the design of the supersonic particulate matter separator described in the report. Briefly stated, these physical parameters include the density of the carrier gas, the density and size of the particulate matter, the velocity of the carrier gas flow and the dimensions of the elements or units. The density of the carrier gas and the density and size of the particulate matter is determined by the gasification process for which the separator system is designed. On the other hand, the velocity of the carrier gas flow and the dimensions of the elements or units of the separator system represent design features which must be optimized for the effective functioning of the system.

As it is described in detail in the above referenced report, the substantially wedge shaped obstruction placed into the path of the supersonic flow of the carrier gas creates a shock zone which is disposed obliquely to the wedge shaped obstruction. The term shock zone refers to a substantially stationary zone in the gas flow wherein a sudden discontinuity of the direction of the gas flow occurs. Although downstream of the oblique shock zone the flow of the carrier gas becomes parallel with the walls of the wedge shaped obstruction, the flow path of the particulate matter is substantially unaffected by the shock zone. This phenomenon provides the theoretical basis for separation of the particulate matter from the carrier gas.

The above mentioned extensive mathematical treatment of the behavior of particulate matter under the conditions of supersonic flow downstream of the shock zone reveals that the momentum range (Λ) which itself incorporates densities, particle size and drag coefficient constants, represents a basic scaling parameter. The momentum range (Λ) has been well defined by two phase flow fluid mechanics theory. The drag coefficient is a standard measure of bodies moving in gas streams, as is explained in standard treatises of physics and fluid flow mechanics.

The relationship between the momentum range (Λ) and the drag coefficient ($C_D$) is given by equation 1, $$\Lambda \simeq 8/3\ \rho_s/\rho\sigma/C_D \qquad \textit{equation 1)}$$

wherein $\rho_s$ and $\rho$ respectively represent the density of the particulate matter and of the carrier gas, and $\sigma$ represents the radius of the particles of the particulate matter. The drag coefficient ($C_D$) is related to the Reynold's number in such a manner that in a high velocity turbulent flow the drag coefficient value is small, in the neighborhood of unity.

A basic relationship between the momentum range (Λ), the velocity of the gas (Vo) and particle flow (Vpo) and the wedge angle (α) was derived and resulted in equation 2.

(equation 2)

$$\frac{\Delta y}{\Lambda} = \frac{V_o}{V_{po}} \cdot \cot\alpha \left( e^{\frac{\Delta x}{\Lambda}} - 1 \right) + \ln\left\{ 1 + \cot\alpha\,(1 - Vo/Vpo)\left( e^{\frac{\Delta x}{\Lambda}} - 1 \right) \right\}.$$

In the above equation Λx represents the movement of the particle in a direction perpendicular to the wedge and Δy represents the movement of the particle parallel to the wedge. Equation 2 represents a good approximation of dimensionless particle trajectories downstream of the oblique shock zone. It can be seen from equation 2 that the particle trajectories are strongly dependent on the momentum range (Λ) which therefore strongly correlates the overall dimensions of an element of the separator system. It is also apparent from equation 2 that particle trajectories are much less sensitive to the velocity of the gas flow as long as the gas flow is substantially in the 0.2-6.0 Mach range.

It was on the basis of equation 2 that actual particle trajectories were calculated, plotted, and the experimental separator system described in the above referenced report was designed.

Although the above described separator system appears capable of providing a viable alternative to the electrostatic precipitators to remove particulate matter from a gas carrier, it suffers from certain disadvantages. It is not capable of effectively removing particles of radius smaller than 1 micron. Moreover, the dimensions of each element or unit of the separator system which includes a nozzle, a substantially wedge shaped member, and a receiving member are of such small magnitude that construction of the system for industrial scale application appears to be expensive. As an example it is noted that the width of a duct provided in each element of the separator system between the wedge shaped member and a wall of the nozzle is of the 0.025 inch magnitude.

Finally, the separator system described in the above referenced report does not contemplate its adaptation for the clean up of stack gases of a coal burning furnace with the attendant problem of removing water vapor and sulphur dioxide together with the removal of particulate matter. In addition this separator system appears to cause an unacceptably high pressure loss in the overall gas flow.

In light of the above, it is readily apparent that there is a need in the art for an improved separator system such as the separator system of the present invention.

SUMMARY OF THE INVENTION

It is an object of the present invention to provide a system which is capable of removing micron and submicron size particles from a carrying gas composition without causing an undue pressure loss in the overall gas flow.

It is another object of the present invention to provide a system which is capable of removing micron and submicron size particles from a carrying gas composition without the use of electrostatic precipitators.

It is still another object of the present invention to utilize the combination of a centrifugal force and of an oblique shock zone in a high velocity gas flow for separating particulate matter from the gas.

It is yet another object of the present invention to provide a system for the removal of micron and submicron size particles from a carrying gas composition which is particularly adapted for the clean up of stack gases emitted by a coal burning furnace.

It is still a further object of the present invention to provide a system for the removal of micron and submicron size particles from the stack gases of a coal burning furnace which simultaneously with the removal of the particles is also capable of removing sulphur dioxide gas and other water soluble gases from the stack gases.

It is yet a further object of the present invention to provide a system for the clean up of stack gases emitted by a coal burning furnace which is economically feasible to construct and operate.

These and other objects and advantages are attained by a separator system wherein a carrying gas composition having at least one condensable component, such as water vapor, is accelerated to a high velocity which is higher than approximately Mach 0.2 and may substantially exceed Mach 1.0. The carrying gas composition is forced to flow at the high velocity in a predetermined flow path wherein its static temperature drops. The decrease of static temperature causes subcooling and condensation of the condensable component. The micron, and mainly submicron particles carried in the gas composition act as nucleation sites for the condensation. The condensation of the condensable component results in liquid droplets which are approximately in the 1-3 micron range. The solid liquid particles are separated from the gas composition in the high velocity flow by elements which force the flow path of the gas composition to differ from the flow path of the particles.

The elements utilize an oblique shock created in the high velocity flow path or a curved path creating a force field or a combination of both, to bring about the desired divergence of the flow path of the gas composition relative to the flow path of the particles. Receiving members are appropriately disposed in the flow path of the particles to capture and remove the same from the gas composition.

The high velocity solid particle separator system is well adapted for utilization in an overall coal burning-furnace-stack-gas-clean-up system. In this overall system the stack gases are first treated in a large scale roughing separator for removal of solid particles larger than approximately 10 microns. A heat exchanger is then provided wherein the stack gases are cooled and a substantial portion of the water vapor contained therein is removed. Micron and submicron sized solid particles together with the residual water vapor and dissolved sulphur dioxide and other dissolved undesirable components are then removed in the high velocity particle separator.

The objects and features of the present invention are set forth in the appended claims. The present invention may be best understood by reference to the following description taken in connection with the accompanying drawings.

DESCRIPTION OF THE PREFERRED EMBODIMENTS

The following specification taken in conjunction with the drawings sets forth the preferred embodiments of the present invention. The embodiments of the invention disclosed herein are the best modes contemplated by the inventors for carrying out their invention, although it should be understood that various modifications can be accomplished within the parameters of the present invention.

It should be noted at the outset that the high velocity separator system of the present invention is particularly adapted for the clean-up of stack gases emanating from coal burning and like furnaces. In addition, the high velocity separator disclosed herein may also be adapted for separation of micron and submicron size solid particles from any carrying gas which contains a component capable of condensation under the operating conditions of the high velocity separator system. For this reason, a general description of the high velocity separator system is made with a view towards its application in a variety of processes wherein micron and submicron size particulate matter must be separated from a large volume of gas.

Figure 1:
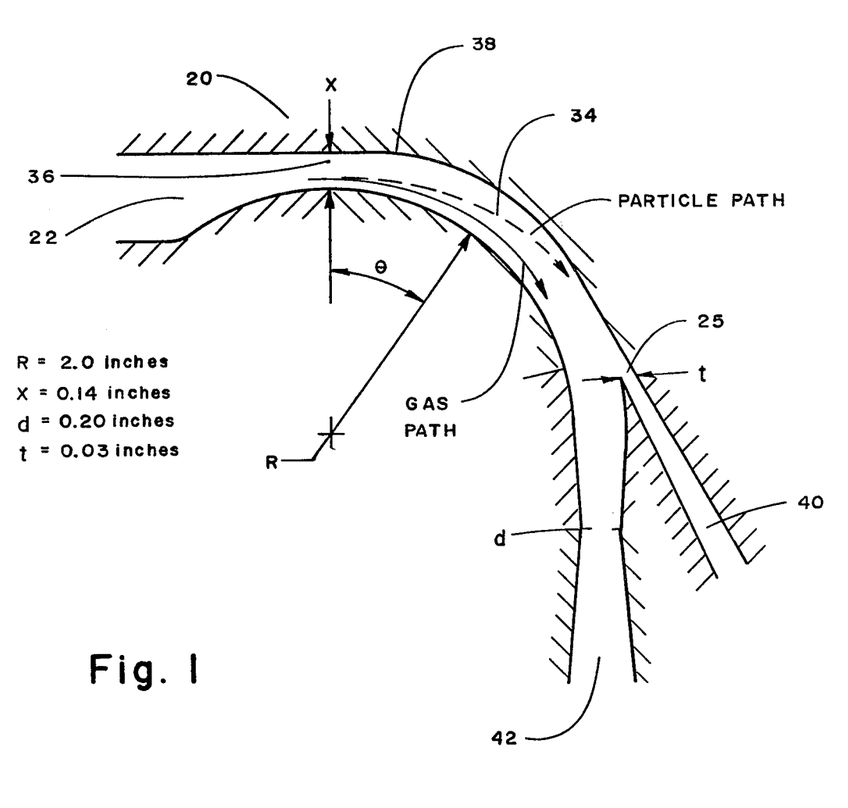
FIG. 1 is a schematic representation of an element of a first specific embodiment of the high velocity separator of the present invention.

Referring now to FIG. 1, a first specific embodiment of an element or unit 20, of the high velocity separator device or system of the present invention is disclosed.

In the first specific embodiment of the present invention, shown in FIG. 1, a gas composition which carries particles of micron and submicron size is forced to enter a nozzle 22. The dimensions of the nozzle 22 and the velocity of the gas flow is selected in such a manner that in a constructed area of the nozzle 22 the gas flow exceeds approximately Mach 0.2 and may even equal or exceed Mach 1.0. As it is described below, as a result of several forces acting on the gas and particle flow in the nozzle 22, the particles traverse across the channel of the flow and enter the slot 25. The driving force for the gas flow may be a fan 24, shown on FIGS. 8 and 9, which is placed downstream of the high velocity separator element. The solid particles contained in the gas flow are substantially free of particles larger than approximately 10 times the size that the separator is designed to remove. Usually, the gas flow, in accordance with the present invention, is substantially free of particles larger than 10 micron. This is because prior to introduction of the gas composition into the high velocity separator, a preliminary separation of the larger particles 1 has been accomplished in an appropriately larger scale roughing separator device, such as a roughing separator, shown on FIG. 9.

Figure 2:
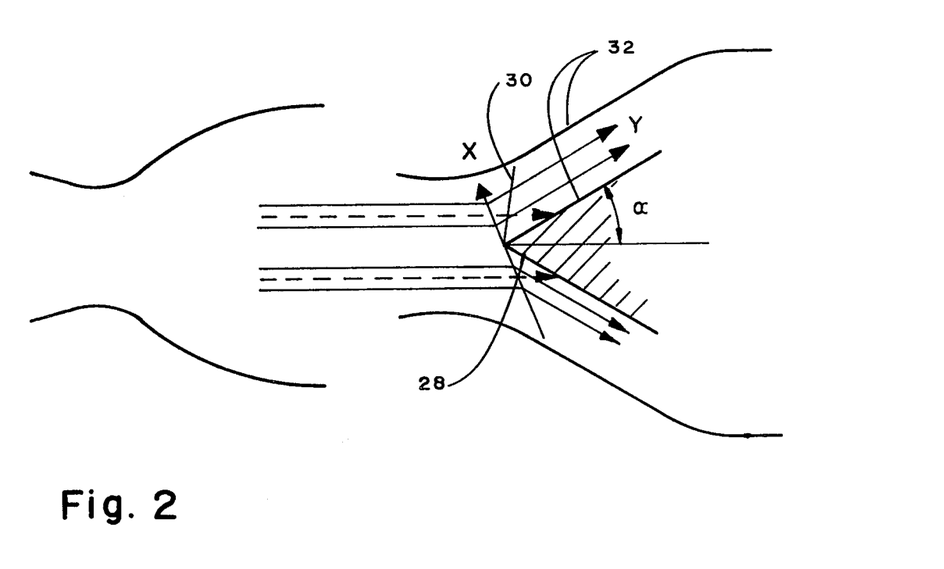
FIG. 2 is a schematic representation of the effect of an oblique shock zone upon a supersonic high velocity gas flow and upon the flow path of particles carried in the gas.
Figure 3:
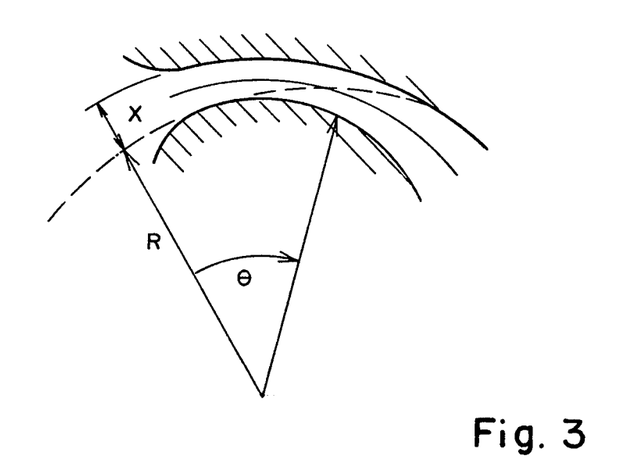
FIG. 3 is a schematic representation of the effect of an oblique shock zone and of a centrifugal force field upon particles carried in a high velocity gas flow in a divergent curved duct.

Referring now to FIGS. 2 and 3, the theoretical basis for the operation of the high velocity separator element 20 is explained. As it was pointed out above in the description of the prior art, a wedge 28 or like obstruction is placed in the path of the high velocity gas flow. This results in a shock zone 30 which is disposed obliquely to the original flow path of the gas composition. The shock zone 30 is a substantially stationary zone within the gas flow in which the direction of the high velocity gas flow undergoes a sudden distontinuity. As it is well known in the aerodynamic and related arts and is shown on FIG. 2, the high velocity gas flow becomes parallel with the walls 32 of the wedge 28 downstream of the shock zone 30. The flow path of micron or submicron size particles is substantially unaffected by the shock zone 30. Consequently, downstream of the shock zone 30, the direction of the flow of the gas composition and of the particles carried therein differ to a substantial extent. This phenomenon, schematically illustrated in FIG. 2, is utilized in the high velocity particle separator 20 of the present invention.

The shock zone and a centrifugal force as they act upon the particles carried in the gas flow may be generically termed inertial forces or inertial means, because it is the inertia of the particles which causes them to flow in a path divergent from the flow of the carrying gas.

Referring now to the schematic drawing of FIGS. 2 and 3, the combined effect of an oblique shock zone 30 and of a centrifugal force upon the high velocity flow of the gas composition and of the particles sustained therein, is illustrated. It should be expressly understood, that FIGS. 2 and 3 only serve the purpose of illustrating the theoretical basis of the operation of the high velocity separator. Specific embodiments of actual separator elements or units 14 are illustrated in FIGS. 1, 4, 5, 6 and 7.

As the gas leaves the nozzle 22, it is forced to flow in a curved path which is formed by a duct 34 provided in the separator element 20. The result of the high velocity flow is that a centrifugal force acts on the gas as well as on the particles. The centrifugal force affecting the particles is, of course, proportional to the mass of the particles. A displacement of the particles in a direction which is substantially at a 90° angle to the flow path $\Delta x_t$, may be expressed by equation 3, $$\Delta x_t \approx \sqrt{R \Lambda} \theta \qquad \text{(Equation 3)}$$

wherein $\Lambda$ is the above discussed momentum range defined by equation 1, R is the mean radius of the turn, and $\theta$ is the angular distance travelled by the particle. It should be noted that the momentum range ($\Lambda$) incorporates terms defining the radius ($\sigma$) and the density ($\rho_s$), and therefore the mass of the particle.

As it was briefly mentioned before, the displacement of a particle relative to the gas flow in a direction substantially at a right angle to the gas flow caused by the shock ($\Delta X_s$) is, in a first approximation, proportional to the momentum range ($\Lambda$). Thus the combined effect of the displacement of the particle along the X axis can be described by equation 4, $$\Delta X \approx \Delta X_s + X_t \qquad \text{(Equation 4)}$$

wherein $\Delta X_s$ signifies the displacement due to the shock and $\Delta X_t$ signifies displacement due to the curvature of the duct 34 or turn.

It should be noted that the principle of utilizing a centrifugal force for the separation of particles from a carrying gas is standard practice in prior art devices such as cyclone separators. Nevertheless this principle has never been applied before in a high velocity flow such as the gas flow utilized in the first specific embodiment of the separator system 20 of the present invention. Moreover, it is well known that cyclone separators operate under conditions where the flow closely approximates the condition of a viscous flow (Strokes Flow). It is also well known in the prior art that cyclone separators are incapable of separating particles which are smaller than approximately 4 micron. Thus, the utilization of a centrifugal force for the separation of particles in the 1.0 to 4 micron range in a gas flow of substantially 0.2 Mach or higher, preferably supersonic velocity comprises one novel feature of the present invention. This feature alone represents a significant advance over the prior art.

Another significant novel feature of the present invention is that submicron particles are also separated from the gas flow by entrapping them in micron sized liquid droplets which are formed in the high velocity gas flow. These features are further explained below with reference to FIG. 1 wherein the operation of the first specific embodiment of the high velocity particle separator 20 is described in detail. On FIG. 1, the gas and particle flow is respectively indicated by solid and dotted arrows. As the gas flow enters the nozzle 22 of the high velocity separator 20, its velocity is increased to a velocity which is in the Mach 0.2 to several Mach range. The increase in velocity is caused by decreasing the size of the duct 34 to form a constriction, designated as 36. The sudden increase in the velocity of the gas flow results in a substantial decrease of the static temperature of the gas. This decrease in static temperature is expressed by Equation 5, $$T_s = T_t - U^2/2gC_p \qquad \text{(Equation 5)}$$

wherein $T_s$ refers to static temperature, $T_t$ refers to total temperature, u refers to the velocity of the gas flow, $C_p$ refers to the specific heat of the gas and g refers to the gravitational constant.

The parameters of the entire system, i.e. the temperature of the incoming gas composition, the partial pressure of the condensable component in the incoming gas composition, and the increase in the velocity of the gas flow in the separator, are selected in such a manner that the condensable component reaches a supersaturated state in the high velocity flow. When the supersaturated state of the condensable component is reached, the condensable component condenses on micron and principally on the submicron size solid particles carried in the gas flow. Thus, the submicron size solid particles serve as condensation or nucleation sites for the supersaturated component.

Experience has shown that the liquid droplets or liquid particles formed as a result of the condensation on the submicron size solid particles are in the micron size range, and therefore are separable by the high velocity separator. Practically all of the submicron size solid particles carried in the gas flow become nucleation sites for the liquid condensation and therefore are entrapped by the liquid particles or droplets. After their formation, the liquid particles or droplets travel in the high velocity separator in substantially the same manner as micron size solid particles and both are separated from the gas flow in the manner described below.

Referring now back to FIG. 1, after entering the duct 34, the gas flow encounters an area wherein a sudden angular discontinuity is provided in the wall 38 of the duct 34. The sudden angular discontinuity 36 acts as a wedge, such as the wedge schematically shown on FIG. 2, in the event the velocity of the gas flow substantially equals of exceeds Mach 1.0. In the event the velocity of the gas flow is substantially less than Mach 1.0, of course, no shock zone is created.

The walls 38 of the duct 34 are curved or bent while they diverge slightly to allow a small change in the velocity of the gas flow. The effect of the bend in the duct 34 combined with the effect of the shock zone, if applicable, causes the liquid and solid particles to follow a trajectory towards the slot 25 provided in the duct 34. The slot 25 comprises the entry point to a second duct 40. The captured solid and liquid particles are removed from the separator unit or element 20 through the second duct 40.

Subsequent to passing through the area adjacent to the slot 25, the carrying gas composition enters a portion of the duct 34 wherein the cross sectional area of the duct 34 is substantially increased relative to the cross sectional area of the constriction 36. This portion of the duct 34 is termed a diffuser 42. In the diffuser 42 the carrying gas composition which is now substantially free of all solid particles, undergoes a substantial decrease in velocity and therefore a corresponding substantial increase in pressure and static temperature. From the diffuser 42, the gas composition is led through the fan 24, shown on FIGS. 8 and 9, into a pipeline (not shown), storage tank (not shown) or is released into the environment. The ultimate disposition of the gas, of course, depends on its nature, i.e. whether it is a stack gas, or some other gas intended for further use. Actual dimensions of the individual element 20 of the first specific embodiment of the high velocity separator system are given in the table which comprises part of FIG. 1.

In alternate embodiments of the high velocity separator of the present invention, instead of being led into the diffuser 42, the clean gas flow may be directed into a turbine wherein a substantial portion of the kinetic energy of the gas is converted into useable mechanical energy. Such an arrangement is described in somewhat more detail in conjunction with FIG. 6.

Figure 7:
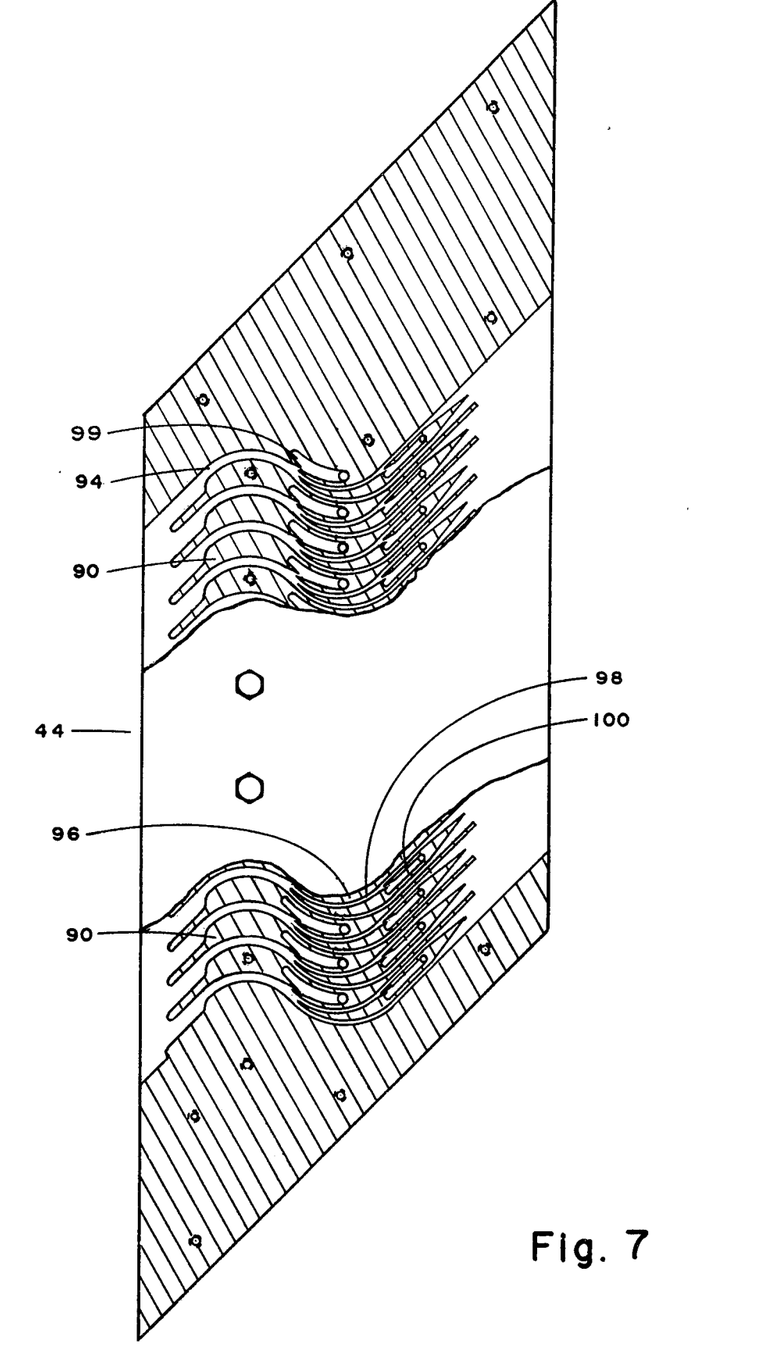
FIG. 7 is a schematic cross sectional representation of an array of elements comprising a fifth specific embodiment of the high velocity separator of the present invention.

In an industrial scale high velocity separator system, an array 44, shown on FIG. 7 of individual separator elements is provided for processing an industrial scale volume of gas. Depending on the actual volume of the gas to be processed, the array 44 may comprise several thousand of individual elements.

Figure 4:
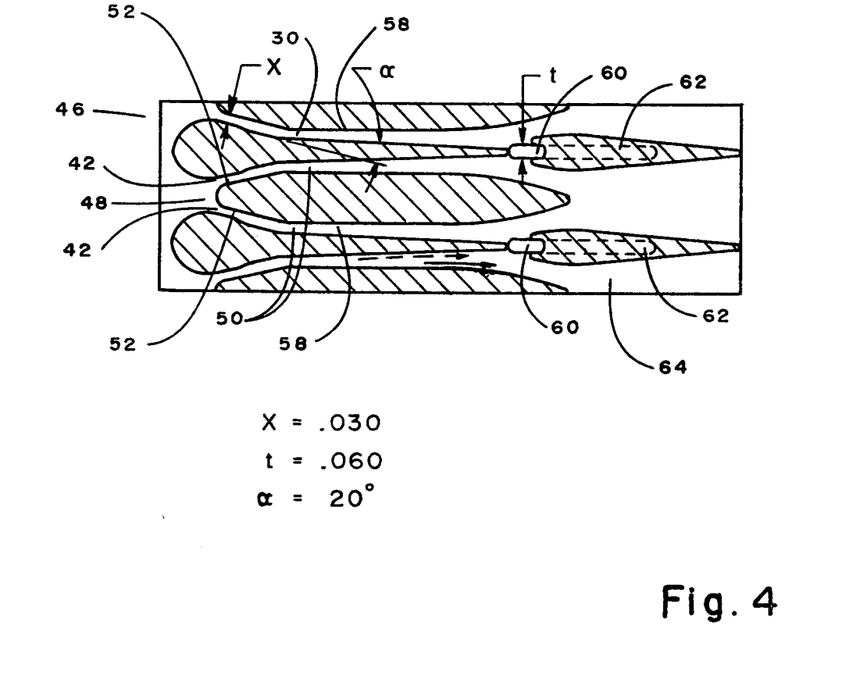
FIG. 4 is a schematic cross sectional representation of an element of a second specific embodiment of the high velocity separator of the present invention.

Referring now to FIG. 4, a second specific embodiment of the high velocity separator system of the present invention is disclosed. The second specific embodiment of the high velocity separator system, comprises individual elements or units 46. In contrast to the first specific embodiment of the high velocity separator system, the elements 46 of the second specific embodiment utilize for the separation of particles only the effect of an oblique shock zone created in the high velocity gas flow. These elements 46 do not utilize a centrifugal force for the separation of particles from the gas composition.

As is shown on FIG. 4, each element or unit 46 incorporates a duct 48 through which the carrying gas composition is forced to flow. A fan 24 affectuating the flow is located downstream of the separator system and is schematically shown on FIGS. 8 and 9. An obstruction member 50 is placed in each duct 42 in such a manner that a constriction 52 is formed within the duct 42. The parameters of the system are designed in such a manner that the gas flow reaches a high velocity in the constriction 52. This high velocity of the gas flow is above Mach 0.5, and for this particular specific embodiment preferably substantially equals or exceeds Mach 1.0.

Immediately adjacent to the constriction 52, a sudden angular discontinuity is formed within the obstruction member 50. This sudden angular discontinuity, indicated as 54 on FIG. 4, acts as a wedge creating a shock zone 30. Downstream of the shock zone 30 the flow of the gas composition is parallel with the gradually converging walls 56 of the obstruction member 50. The flow path of the particles, on the other hand, is substantially unaffected by the shock zone 30 and takes the direction of the original direction of the gas flow. Walls of the duct 58 are formed in a gradually diverging disposition, as is shown on FIG. 4, so as to allow for a gradual decrease in the velocity of the gas flow and so as not to interfere with the flow of the particles. In FIG. 4, as in FIG. 1, the flow of the gas and of the particles is respectively indicated by solid and dotted arrows.

In order to capture the particle flow, receiving members 60 are placed in the path of the particle flow. Each receiving member 60 has a slot 62 wherein the particles enter the receiving member 60 to be captured therein. Vertically disposed ducts 64 connect a plurality of receiving members 60 which are provided in an array, shown on FIG. 7, of individual separator elements 46. The captured particles are removed from the separator system through the ducts 64.

Due to the particular shape of the elements 46 of the second specific embodiment of the separator system, this separator system is referred to as a bent wall type separator. Approximate dimension of the unit 46 of the bent wall type separator are given in the table which comprises part of FIG. 4.

Although the bent wall type separator unit 46 has been described in the above referenced report entitled "Investigation of High Velocity Wedge Separator For Particle Removal in Coal Gasification Plants" its utilization for the removal of submicron size particles has not been disclosed. The ability to utilize the bent wall separator for removal of submicron size particles comprises another principal novel feature of the present invention. In this regard it should be clearly understood that neither the first nor the second specific embodiment of the separator system of the present invention is capable of effectively removing submicron size particles unless the submicron size particles are trapped within liquid droplets reaching approximately 1.0 micron or larger size. This is apparent not only from practical experience, but also from an inspection of equation 1 and 2, wherein a very small value of the particle radius ($\sigma$) results in a corresponding small momentum range ($\Lambda$). A very small momentum range ($\Lambda$), in turn would require a high velocity separator of such small dimensions which may be impractical or impossible to design and construct.

With regards to the entrapment of submicron size particles in liquid droplets, the second specific embodiment of the separator system operates in the same manner as the first specific embodiment. Thus, as the gas composition is accelerated to a high velocity its static temperature decreases to cause condensation of the condensable components upon the submicron size solid particles. After formation, the micron size liquid droplets or particles travel on substantially the same trajectory as the micron size solid particles and are captured together with the same.

Figure 5:
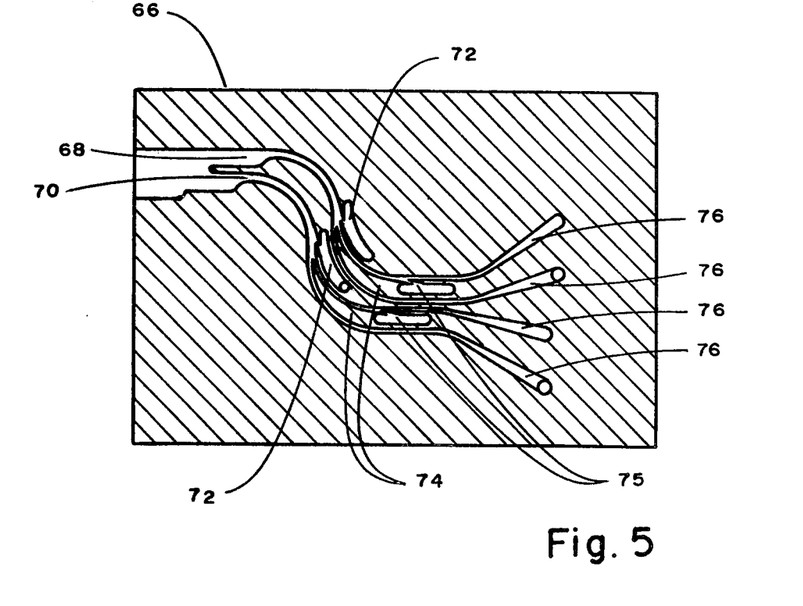
FIG. 5 is a schematic cross sectional representation of an element of a third specific embodiment of the high velocity separator of the present invention.

Referring now to the schematic cross sectional view of FIG. 5, an element of a third specific embodiment of the high velocity separator of the present invention is disclosed. Because a detailed description of the first and second specific embodiments has been provided above, the ensuing description of the third and other embodiments is given only to the extent necessary for an understanding of these embodiments in light of the above disclosure.

In the element 66, the gas flow is divided into two streams which flow in two ducts respectively bearing the reference numerals 68 and 70. The combined cross section of the two ducts 68 and 70 is selected in such a manner that the velocity of the gas flow in the ducts 68 and 70 exceeds Mach 0.2. Each duct 68 and 70 is curved and produces the hereinbefore described centrifugal force on the gas flow and on the particles carried in the gas flow. As a result of the centrifugal force, a portion of the solid particles and liquid particles condensed thereon enter a first collecting slot 72 which is provided in each duct 68 and 70.

Downstream of the first slot 72, the gas flow in each duct encounters an obstruction member 74 which creates the hereinbefore described shock zone in the gas flow. The obstruction member creates a shock zone and divides the gas flow into a clean stream from which no more solid and liquid particulate matter is collected, and into a dirty stream. As a result of the shock zone and of further curvature of the ducts 68 and 70, remaining particles in the dirty stream of the gas flow and further condensed liquid particles are hurled towards second collecting slots 75 which are provided in the ducts. Thus, in the elements 66 the separation of solid and liquid particles from the gas flow is accomplished in two consecutive stages whereby an increased efficiency is achieved.

Still further downstream of the second collecting slots 75, the clean gas flow enters diffusers 76 wherein the velocity of the gas flow is reduced and the original pressure of the gas flow is substantially regained. In the third specific embodiment of the high velocity separator of the present invention, as in the other embodiments, a gas flow escaping through the collecting slots 72 and 75 is approximately 10% or less of the entire gas flow. The escaping gas flow is customarily termed bleed flow.

Figure 6:
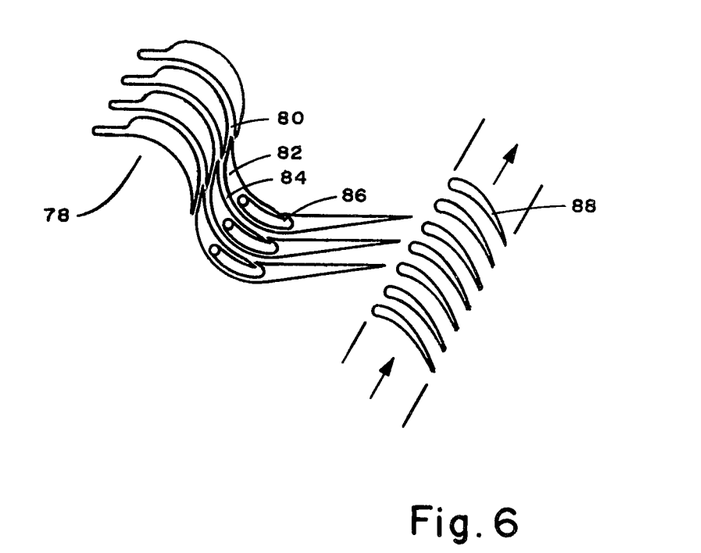
FIG. 6 is a schematic representation of an element of a fourth specific embodiment of the high velocity separator of the present invention.

Referring now to FIG. 6, elements 78 of a fourth specific embodiment of the high velocity separator of the present invention are disclosed. In the elements 78 the high velocity gas flow after having travelled in a duct 80 of a first curvature encounters an obstruction member 82 which creates a shock zone and divides the gas flow into two streams. In each of the streams the gas flow is further channeled among walls 84 of a second curvature. Collecting slots 86 are incorporated in the walls 84 of the second curvature. These collecting slots capture the solid particles and the condensed liquid particles. Further downstream of the collecting slots 86 the clean gas flow is directed to drive turbine blades which are schematically illustrated on FIG. 6 as 88.

FIG. 7 is a schematic illustration of an array 44 of separator elements 90 which are substantially similar to the separator elements shown on FIG. 5. In the elements 90, as in the elements 66, solid and liquid particulate matter is initially collected in first collecting slots 92 after the high velocity gas flow travels through a curved duct 94. Downstream of the first collecting slots 92, the gas flow encounters obstruction members 96 which create a shock zone and which divide the gas flow into clean and dirty streams. Still further downstream, second curved ducts 98 and second collecting slots 100 are positioned in the dirty stream to collect the remaining solid and liquid particulate matter. The collecting slots 92 and 100 in the array 44 are connected by vertically disposed ducts (not shown) through which the collected particulate matter is removed from the array 44. In an industrial scale separator, the array 44 may contain several thousand individual elements.

Several applications in the chemical and related industries for the novel, high velocity separator systems of the present invention are readily apparent in light of the above teachings. In fact, the hereinbefore described separator systems may even be used in applications wherein the carrying gas does not inherently contain a condensable component. In these cases a condensable component such as steam may be injected into the carrying gas so as to render the separation of submicron size particles possible. A particularly readily apparent application wherein steam may be injected into the carrying gas prior to introduction into the high velocity separator is the hydrocarbon catalytic cracking process.

The high velocity separator system of the present invention is, however, mainly designed for the removal of submicron and micron size particles from gaseous products formed during the combustion of fossil fuels. Before discussing in detail an overall system for the effective clean up of stack gases of a coal burning boiler or furnace, it is noted that a large number of power plants burn diesel or like hydrocarbon fuels. Emission of micron and submicron size particles from such plants presents a serious environmental problem. Moreover, diesel engines of motor vehicles similarly emit a significant amount of micron and submicron size solid particles. The elimination of particulate pollution by diesel exhaust presents a problem which has not been adequately solved in the prior art. The hereinbefore described high velocity separator systems may be used for the clean up of the exhaust gases of diesel engines also. In the case of fossil fuel burning furnaces and internal combustion engines a relatively large amount of water vapor is always present in the exhaust gases. This acts as a condensable component enabling the hereinbefore described high velocity separator systems to remove submicron size particles.

Figure 8:
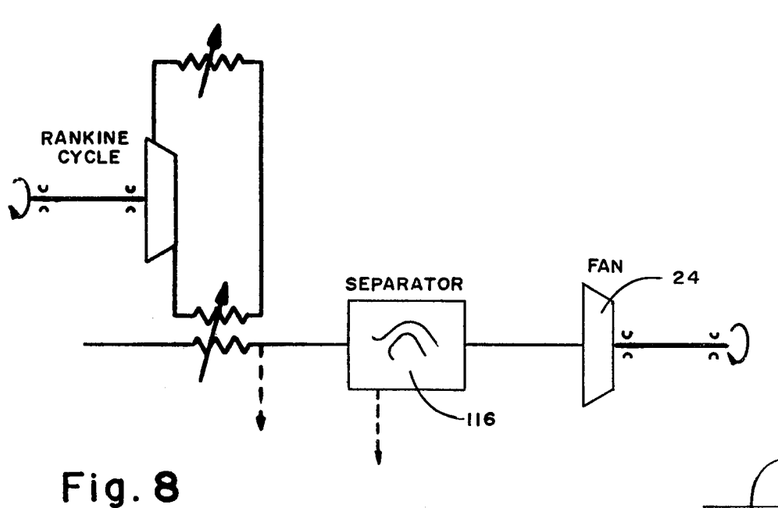
FIG. 8 is a block diagrammatic representation of an overall stack-gas-clean-up system incorporating the high velocity separator of the present invention.
Figure 9:
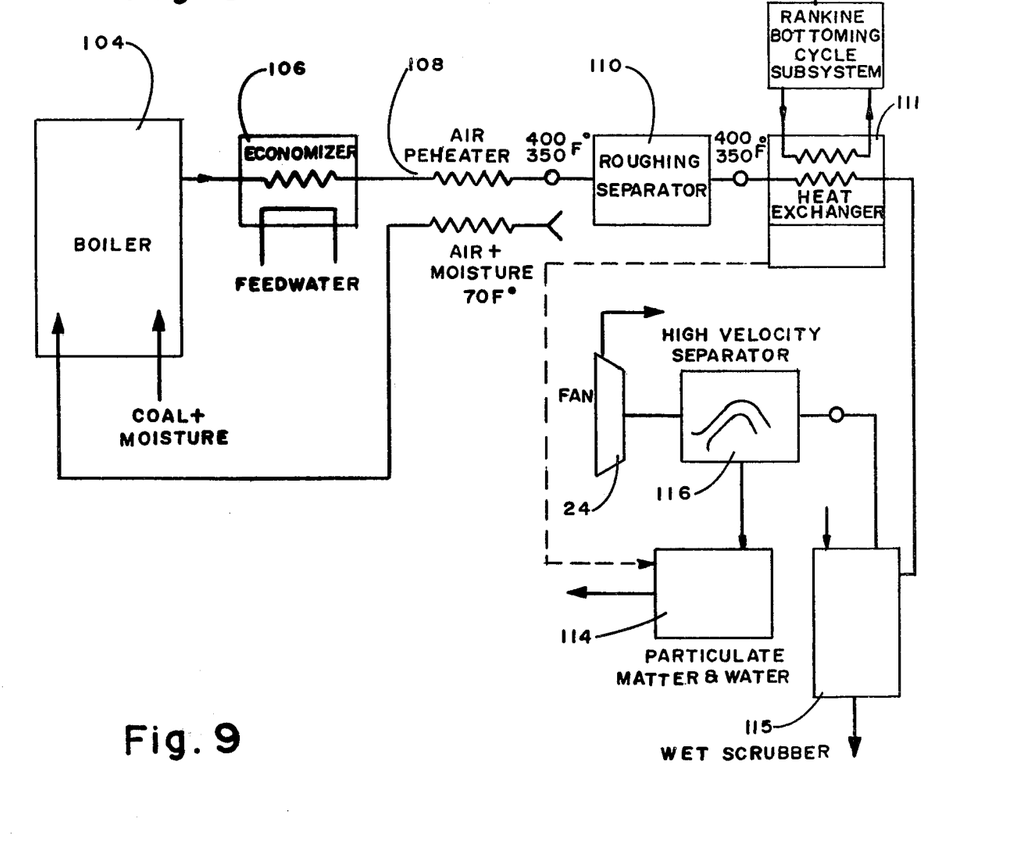
FIG. 9 is a detailed block diagrammatic representation of the overall stack-gas-clean-up system incorporating the high velocity separator of the present invention.

Referring now to FIGS. 8 and 9, a system for the effective clean up of stack gases emitted by a coal burning furnace or power plant is disclosed. FIG. 8 is a block diagrammatic representation of the most important components of the clean up system, and FIG. 9 is a more detailed block diagrammatic representation of the overall system.

A coal burning furnace or boiler, designated as 104 on FIG. 9, generates approximately 1 pound of water vapor for each pound of coal burned in the furnace 104. The combustion products which are present in the stack gases include, in addition to water vapor and gaseous products such as carbon dioxide and carbon monoxide, solid particulate matter and sulpher dioxide gas. Furthermore, alkali metal oxides are also known to be present in the stack gases. It is well known that high sulpher coal contains approximately 3% (by weight) sulphur. The sulphur, after combustion, is principally present in the stack gases in the form of sulphur dioxide. The chemical combustion of the particulate matter, called fly ash, is best briefly described as inorganic matter containing some carbon and carboniferous material.

The particulate matter derived from the combustion of coal can be basically classified in 3 categories according to size. The first category contains particulate matter which is larger than 10 micron. The second category contains particulate matter which is in the size range of 1.0 to 10 microns. The third category contains particulate matter which is smaller than 1.0 micron. The number of particles in the particulate matter of the third category is estimated to be $10^{15}$ for each ton of coal combusted. The average particle size of the particulate matter of the third category is approximately 0.50 micron, and it has an apparent surface on the order of $10^4$ foot$^2$ per ton of coal combusted. As it has been mentioned above, it is the particulate matter of the third, submicron size category which the prior art has found exceedingly difficult to remove. These submicron size particles are not only removed in the high velocity separator systems of the present invention, but by acting as nucleation sites also contribute to the simultaneous removal of sulphur dioxide and other gases from the stack gases.

Referring again to FIGS. 8 and 9 and particularly to FIG. 9, the hot stack gases having an approximate temperature of 1000° F. are first led into a first heat exchanger or economizer 106 wherein feed water of the boiler or furnace 104 is preheated. From the first heat exchanger or economizer 106 the stack gases are led into a second heat exchanger, or a preheater 108, wherein the air utilized in the furnace 104 is preheated to approximately 70° F. temperature. The temperature of the stack gases as they leave the air preheater 108 is approximately 350°–400° F. From the air preheater 108 the stack gases are led into a roughing separator 110 of conventional construction wherein substantially all of the particulate matter of the first category, i.e. particulate matter larger than 10 micron, is removed. The construction of the heat exchangers 106 and 108 and of the roughing separator 110 need not be disclosed here in detail since these are well known in the prior art.

The temperature of the stack gases leaving the roughing separator 110 is still approximately 350°–400° F. In order to introduce the stack gases into the high velocity separator system of the present invention, it is necessary to lower their temperature, preferably to approximately 100° F.

Cooling of the stack gases from 400°–350° F. to approximately 100° F. is accomplished in a heat exchanger or vaporizer 111 which is coupled to a Rankine cycle subsystem 112. In the Rankine cycle subsystem 112 thermal energy contained in the stack gases is converted to kinetic energy. The process of cooling the stack gases from 400°–350° F. to approximately 100° F. coupled with the utilization of the heat in the Rankine cycle subsystem 112 results in capturing the "waste heat" of the stack gases.

The construction of a Rankine cycle subsystem 112 may be readily accomplished according to standard practice in the prior art. Nevertheless it is noted that in view of the relatively low temperature of the stack gases at this stage of the process (400°–350° F.) a low boiling organic liquid such as isobutane, is preferred as a working fluid for the Rankine cycle subsystem 112. The kinetic energy derived from the Rankine cycle subsystem 112 may be conveniently utilized for powering the fan 24. As it was mentioned above, it is the fan 24 which forces the flow of the exhaust gases through the entire clean up system including the high velocity separator.

The temperature of the stack gases drops in the Rankine cycle subsystem from 350°–400° to approximately 100° F. During this process, a substantial amount of the water vapor contained in the stack gases condenses. A significant amount of sulphur dioxide is dissolved in the water condensed in the heat exchanger of the Rankine cycle. This already results in a partial elimination of the undesirable sulphur dioxide from the stack gases. The water condensate containing the sulphur dioxide can then be treated by conventional methods in a residue clean-up system 114. From the residue clean-up system 114 substantially clean water and a final solid waste product of the coal combustion is obtained. The stack gases may then optionally be passed through a wet scrubber 115 wherein lime solution interacts with the water condensate to produce calcium sulfite. The wet scrubber 115 may also be designed to remove nitrogen oxide (NOX) products.

Thereafter the stack gases still containing a significant amount of water vapor, sulphur dioxide gas and solid particulate matter of the second and third category, are then introduced into the high velocity separator system. The high velocity separator may also be referred to as a two-phase particulate separator because the particulate matter is obtained therein in solid and liquid phases. The high velocity separator system, as applied in the overall stack-gas-clean-up system bears the reference numeral 116 on FIGS. 8 and 9. The high velocity separator system 116 contains, as mentioned above, an array of several thousand individual separator elements. These individual elements or units are constructed according to one of the specific embodiments of the high velocity separator system of the present invention, as is described above. In this regard it is noted that utilization of a specific embodiment of the high velocity separator system of the present invention wherein a centrifugal force is combined with the shock zone to provide separation is preferred. This is because such specific embodiments can be constructed at a lesser cost and are capable of functioning at a greater efficiency than the second specific embodiment wherein only a shock zone is utilized.

In the high velocity separator system 116, substantially all of the solid particulate matter of the second category (size range 1.0 to 10 microns) and the solid particulate matter of the third category (less than 1.0 micron size) is separated from the stack gases. As it was described above, the static temperature of the gas drops significantly when the gas flow is accelerated. At this point, a substantial portion of the residual water vapor still contained in the stack gases condenses. During the process of condensation the latent heat of the supersaturated water vapors is released into the gas flow. Both theoretical considerations and experience have shown that during the short period of time the water droplets are contained within the high velocity flow, the temperature of the water vapors is not equilibrated with the temperature of the gas flow.

When the stack gases are decelerated to a low velocity in the diffuser 42 the static temperature again increases according to Equation 6. A net result of the transfer of the latent heat contained in the water vapor to the carrying gas is that the gas exiting from the high velocity separator 116 is at a higher temperature than at the point of entry into the high velocity separator 116. On the other hand, the captured liquid is at a substantially lower temperature then at the entry point. The temperature of the exiting liquid is approximately 40° F. The solubility of sulphur dioxide gas at 40° F. and at 760 Hg mm (one atmosphere) total pressure is approximately 18 grams of sulphur dioxide per 100 grams of water. Therefore, practically all of the residual sulphur dioxide gas is absorbed in the condensed water in the process of passing the stack gases through the high velocity separator 116. Considering that approximately 1 pound of water is present in the stack gases for each pound of coal originally combusted in the furnace 104, it is quite apparent that sufficient water is present in the stack gases to absorb substantially all of the sulphur dioxide under the overall conditions of the herein described clean up system. Thus, the stack gases exiting from the high velocity separator 116 are substantially free of particulate matter and of sulphur dioxide as well.

In addition to absorbing sulphur dioxide the water condensed in the high velocity separator 116 also absorbs residual alkali metal oxides which may still be present in the gas flow.

An aqueous slurry containing the solid particles and dissolved sulphur dioxide gas is discharged from the high velocity separator 116. The slurry is then led into the residue clean up system 114 wherein the sulphur dioxide and solid particulate matter may be removed by conventional methods prior to discharge of clean water into the environment.

The significant advantages of the hereinbefore described high velocity separator system and of the overall stack-gas-clean-up system readily apparent, i.e. the effective removal of solid particulate matter and of sulphur dioxide from stack gases of a coal burning furnace. Moreover, all or at least most of the energy required to operate the system is derived from the waste heat of the stack gases through the Rankine cycle subsystem.

The high velocity particulate matter separator system of the present invention may also be utilized in several other applications wherein removal of particulate matter including particulate matter of the submicron range, is desired. Various modifications of the present invention may become readily apparent to those skilled in the art. Accordingly, the scope of the present invention should be interpreted solely from the following claims.

What is claimed is:

1. A device for separating particles of approximately 1–10 microns in size carried in a gas composition, the device comprising:

means for accelerating a flow of the gas composition to a high velocity;

an array of ducts having a predetermined curvature wherein the gas composition is forced by said accelerating means to travel at the high velocity, a lower limit of the high velocity being substantially Mach 1.0; both the gas composition and the particles therein being affected by centrifugal forces arising as a result of travel in the ducts, the centrifugal forces affecting the particles causing them to travel in flow paths differing from the flow paths of the gas composition;

a plurality of members, at least one member being associated with each duct in the array of ducts, each member having a wall incorporating an abrupt angular discontinuity which is in contact with the high velocity flow of the gas, said members comprising means for creating an oblique shock zone in the high velocity flow of the gas, the flow paths of the gas composition being affected by the shock zone and the flow paths of the particles carried in the gas composition being substantially unaffected by the shock zone, and a plurality of slots, at least one slot being operatively associated with each duct in the array of ducts and being disposed in the respective flow paths of the particles downstream of the curvature and the shock zone in each duct, the plurality of slots comprising collecting means for the particles whereby the particles separated from the gas composition by the centrifugal forces and by shock zone are captured.

2. The invention of claim 1 wherein each member is a wall of a respective duct in the array of ducts.

3. The invention of claim 1 wherein the collecting means further comprise a plurality of second ducts, each duct of the array of ducts having the associated slot, the slot comprising an inlet into at least one of said second ducts, the particles entering the inlet and being discharged through the second ducts.

4. The invention of claim 1 wherein the particles captured from the gas composition are in the 1.0-4.0 micron range.

5. A process for separating solid particles including particles smaller than 1.0 micron, from a carrying gas composition, the gas composition having at least one condensable gaseous component capable of condensation under operative conditions of the process, the process comprising the steps of:

passing the gas composition through a curved duct, a centrifugal force arising in the curved duct affecting the direction of travel of the particles in a different manner than the travel of gaseous components of the carrying gas composition;

accelerating the flow of the gas composition to a high velocity the lower limit of which is substantially Mach 1.0 whereby the static temperature of the gas composition becomes lower at the high velocity than prior to said acceleration and whereby at least a portion of the condensable component condenses on the solid particles initially smaller than approximately 1.0 micron, said small particles acting as condensation sites resulting in liquid particles of a size larger than 1 micron, said liquid particles entrapping said small solid particles;

causing a shock zone to occur in the high velocity flow of the gas composition whereby a flow path of the solid particles and of the condensed liquid particles entrapping said particles initially smaller than approximately 1.0 micron is further diverted from the flow path of the gaseous components, and collecting said solid particles and liquid particles.

6. The process of claim 5 wherein the condensable component is water vapor.

7. The process of claim 6 wherein the gas composition is derived from the stack gases of a coal burning furnace.

8. The process of claim 7 wherein the gas composition contains sulphur dioxide gas and wherein a portion of the sulphur dioxide gas is removed from the gas composition by being absorbed in liquid water particles which entrap the solid particles smaller than approximately 1.0 micron.

* * * * *

UNITED STATES PATENT AND TRADEMARK OFFICE
CERTIFICATE OF CORRECTION

PATENT NO. : 4,292,050
DATED : September 29, 1981
INVENTOR(S) : Hans D. Linhardt and John H. Beveridge It is certified that error appears in the above—identified patent and that said Letters Patent is hereby corrected as shown below:

Column 2 - line 43, insert --(-- before the word "equation".

- line 65, delete "$\Lambda$x" and insert --$\Delta$x--.

Column 6 - line 58, after "+" insert --$\Delta$-- before "x".

Signed and Sealed this

Fifteenth Day of December 1981

|SEAL|

Attest:

GERALD J. MOSSINGHOFF

Attesting Officer       Commissioner of Patents and Trademarks